(12) United States Patent
Aviles-Casco et al.

(10) Patent No.: US 10,056,084 B2
(45) Date of Patent: Aug. 21, 2018

(54) TAMPER-RESISTANT ELEMENT FOR USE IN SPEAKER RECOGNITION

(71) Applicant: Cirrus Logic International Semiconductor Ltd., Edinburgh (GB)

(72) Inventors: Carlos Vaquero Aviles-Casco, Madrid (ES); Luis Buera Rodriguez, Madrid (ES); Marta Garcia Gomar, Madrid (ES)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 0 days.

(21) Appl. No.: 15/216,196

(22) Filed: Jul. 21, 2016

(65) Prior Publication Data

US 2016/0329052 A1 Nov. 10, 2016

Related U.S. Application Data

(63) Continuation of application No. 14/281,373, filed on May 19, 2014, now Pat. No. 9,431,016.

(30) Foreign Application Priority Data

Jan. 17, 2014 (EP) .................................. 14151638

(51) Int. Cl.
*G10L 21/00* (2013.01)
*G10L 17/02* (2013.01)
(Continued)

(52) U.S. Cl.
CPC .............. *G10L 17/02* (2013.01); *G06F 21/32* (2013.01); *G06F 21/34* (2013.01); *G06F 21/72* (2013.01);
(Continued)

(58) Field of Classification Search
None
See application file for complete search history.

(56) References Cited

U.S. PATENT DOCUMENTS 5,522,012 A * 5/1996 Mammone .............. G10L 17/02
704/231
5,893,057 A * 4/1999 Fujimoto ................ G10L 17/00
704/246

(Continued)

FOREIGN PATENT DOCUMENTS

WO 2010066435 A1 6/2010

OTHER PUBLICATIONS

S.J.D. Prince, "Probabilistic linear discriminant analysis for inferences about identity" in ICCV-11 th; IEEE, 2007, pp. 1-8.

(Continued)

*Primary Examiner* — Marcus T Riley
(74) *Attorney, Agent, or Firm* — Jackson Walker L.L.P.

(57) ABSTRACT

A tamper-resistant element for use in speaker recognition, the tamper-resistant element being adapted for storing data representing speaker information based on speaker recognition enrollment data and for checking whether information based on a speaker recognition testing signal matches the speaker information, characterized in that the tamper-resistant element is also adapted for carrying out a data integrity check, a system comprising such a tamper-resistant element and method for speaker recognition.

24 Claims, 3 Drawing Sheets

(51) Int. Cl.
*G06F 21/32* (2013.01)
*G10L 15/14* (2006.01)
*G10L 17/06* (2013.01)
*G10L 19/018* (2013.01)
*G10L 17/00* (2013.01)
*G06F 21/34* (2013.01)
*G06F 21/72* (2013.01)
*G10L 17/08* (2013.01)
*H04L 9/32* (2006.01)
*G10L 17/16* (2013.01)

(52) U.S. Cl.
CPC ............ *G10L 15/14* (2013.01); *G10L 15/142* (2013.01); *G10L 17/00* (2013.01); *G10L 17/005* (2013.01); *G10L 17/06* (2013.01); *G10L 17/08* (2013.01); *G10L 19/018* (2013.01); *H04L 9/3231* (2013.01); *G10L 17/16* (2013.01)

(56) References Cited

U.S. PATENT DOCUMENTS

| | | | | |
|---|---|---|---|---|
| 7,386,448 B1* | 6/2008 | Poss | ........................ | G10L 17/24 379/188 |
| 7,478,065 B1 | 1/2009 | Ritter | | |
| 2003/0200087 A1* | 10/2003 | Aronowitz | .............. | G10L 17/08 704/241 |
| 2004/0107099 A1* | 6/2004 | Charlet | ................... | G10L 17/12 704/234 |
| 2015/0206538 A1* | 7/2015 | Aviles-Casco | .......... | G10L 17/00 704/246 |
| 2015/0245154 A1* | 8/2015 | Dadu | ..................... | G06F 3/167 381/56 |

OTHER PUBLICATIONS

Dehak N, Kenny P, Dehak R, Dumouchel P, Ouellet P. Front-End Factor Analysis for Speaker Verification; Audio, Speech, and Language Processing, IEEE Transactions on Audio, Speech and Language Processing, vol. 19, No. 4, May 2011.

M.F. Benzeghiba and H. Bourlard, "User customized HMM/ANN-based speaker verification", IDIAP-RR 01-32, Oct. 23, 2001.

L. R. Rabiner and B.H. Juang, Fundamentals of Speech Recognition, Signal Processing, A. Oppenheim, Series Ed., Englewood Cliffs, NJ: Prentice-Hall, 1993.

Struif, B. et al., "Smartcards with Biometric User Verification", XP010604829, 2002 IEEE, vol. 2, Aug. 26, 2002, pp. 589-592.

Struif, B., "Use of Biometrics for User Verification in Electronic Signature Smartcards", XP009179042, pp. 220-227, Retrieved from the Internet on Jan. 1, 2001: URL: http://zavir.sit.fraunhofer.de/str01.pdf.

Choi, Woo-Yong et al., "SVM-Based Speaker Verification System for Match-on-Card and Its Hardware Implementation", XP009179016, ETRI Journal, vol. 28, No. 3, Jun. 1, 2006, pp. 320-328.

Sanchez-Reillo, R., "Architectures for Biometric Match-on-Token Solutions", BioAW 2014, LNCS 3087, pp. 195-204, Retrieved from the Internet on Jan. 1, 2004: URL: http://download.springer.com/static/pdf/149/chp%253A10.1007%252F978-3-540-25976-3_18.pdf?auth6=1405502914_ecci631f0a2425341b162b3d2d3d8172&ext=.pdf.

Hachez, G. et al., "Biometric, Access Control, Smart Cards: A not a simple Combination", XP002365153, Trieved from the Internet on Jan. 31, 2006: URL: http://citeseer.ist.psu.edu/378715.html.

European Search Report for Application No. 14151638.5, dated Sep. 29, 2014.

Kenny, Patrick, "Joint Factor Analysis of Speaker and Session Variability: Theory and Algorithms", Draft Version, Jan. 13, 2006, pp. 1-17.

Rabiner, Lawrence R., "A Tutorial on Hidden Markov Models and Selected Applications in Speech Recognition", Proceedings of the IEEE, vol. 77, No. 2, Feb. 1989.

Smart Card Alliance, "Smart Cards and Biometrics", Publication date: Mar. 2011.

Extended European Search Report, Application No. 17209669.5, dated Jul. 11, 2018.

Anonymous, "ARM Security Technology Building a Secure System using TrustZone", Apr. 1, 2009.

* cited by examiner

TAMPER-RESISTANT ELEMENT FOR USE IN SPEAKER RECOGNITION

CROSS-REFERENCE TO RELATED APPLICATIONS

The present application is a continuation of U.S. patent application Ser. No. 14/281,373, filed May 19, 2014, which claims priority to European Application No. 14 151 638.5, filed Jan. 17, 2014. The priority applications, U.S. Ser. No. 14/281,373 and EPO 14 151 638.5, are hereby incorporated by reference.

FIELD OF THE DISCLOSURE

The present disclosure relates to a tamper-resistant element for use in speaker recognition, a system comprising such a tamper-resistant element and a method for speaker recognition using a tamper-resistant element.

BACKGROUND

Speaker recognition relates to recognizing a speaker by the characteristics of his or her voice. There are typically two phases in speaker recognition: in a first step a speaker whose identity is typically known is enrolled, and a voice print of the speaker is stored. In a second step, speaker recognition takes place, i.e. characteristics of a speaker's voice are extracted (derived) from a speaker recognition testing signal, which is an audio signal, and compared to one or more stored voice prints.

Speaker recognition may refer to speaker verification, i.e. confirming or refusing that a person who is speaking is who he or she says to be or is assumed to be. In speaker verification, a voice print of one speaker is compared to information based on a speaker recognition testing signal received in the recognition phase.

Speaker recognition may also mean speaker identification, i.e. determining which of a number of enrolled persons is speaking. In such a speaker identification system, there are typically N enrolled speakers (N may be equal to 1, 2, 3, or more) and for each enrolled speaker n (n$\in$[1; N]) a voice print is present.

Then, information based on a speaker recognition testing signal is compared against the voice prints of each enrolled speaker to determine which speaker is probably the speaker of the speaker recognition testing signal. For example, it may be determined which voice print has the best match (or which voice prints have the best match(es)) with the information based on the speaker recognition testing signal. Then, an optional speaker verification may be done to confirm or refuse whether the speaker(s) whose voice print(s) had the best match(es) with the information based on the speaker recognition testing signal is (are) the speaker or not.

In speaker identification an open set of speakers may be used, i.e. it is possible that the speaker who is speaking is not included in the N enrolled speakers or a closed-set of speakers may be used if the speaker is always comprised in the enrolled speakers. For example in closed-set speaker identification, the previously mentioned optional speaker verification in speaker identification may not be necessary as the enrolled speaker whose voice print has the best match with the information based on the speaker recognition testing signal is typically the speaker of the speaker recognition testing signal.

Speaker recognition uses biometrical data. Other than a password which may be replaced easily, the biometrical data, once known to the public, cannot be safely reused. Thus, such biometrical data, e.g. a voice print, needs to be protected against unauthorized access, i.e. to maintain the confidentiality of the data.

A speaker verification system using a smart card and its hardware implementation is known from the article "SVM-Based Speaker Verification System for Match-on-Card and Its Hardware Implementation" by Woo-Yong Choi et al. published in the ETRI Journal, Vol. 28, No. 3, June 2006. In this system, the data representing biometrical information is stored inside the smart card and the matching of the information comprised in a testing signal with the biometrical information is done inside the smart card. Thus, the biometrical information is protected from being accessed.

However, this system has several disadvantages, e.g. it can only analyze using a support vector machine, is only usable for speaker verification, is only applicable for text-dependent speaker, i.e. for speaker verification for which the same lexical content has to be spoken during recognition as during enrollment, verification and does not comprise safety measures against attacks.

SUMMARY OF THE DISCLOSURE

The present disclosure is related to providing means for better speaker recognition, in particular with improved security.

Typically, data representing speaker information is generated based on speaker recognition enrollment data and stored. Herein, the speaker recognition enrollment data typically comprises or consists of one, two, three or more files with audio samples of a speaker's voice. When the audio samples are recorded, the identity of the speaker is usually known.

Data representing speaker information may comprise or consist of data derived from the speaker recognition enrollment data, e.g. by a statistical analysis and/or by using pre-defined algorithms. It may in particular comprise or consist of a voice print of the speaker.

Alternatively or additionally, data representing speaker information may comprise the speaker recognition enrollment data as such. This may allow adding further enrollment audio samples at a later time, which may thus e.g. allow deriving a new voice print including the information comprised in additional enrollment audio samples. In other embodiments, data representing speaker information may not comprise the speaker recognition enrollment data as such (e.g. because uploading it into the tamper-resistant element may require too much bandwidth, and storing it there may also require too much storage memory).

A tamper-resistant element may for example be or comprise a smartcard, such as a SIM card or other smartcards, e.g. of the type typically used for debit or credit cards, and/or it may be or comprise another secure element, e.g. a secure server, a trusted platform module or an ARM trust zone.

The tamper-resistant element is adapted for storing data representing speaker information. The tamper-resistant element may be adapted for storing data representing speaker information of one or more speakers. A speaker whose data is stored on a tamper-resistant element is considered enrolled.

Information based on the speaker recognition testing signal is typically derived from the speaker recognition testing signal, e.g. by a statistical analysis and/or by using pre-defined algorithms Typically, the statistical analysis and/ or used algorithms are determined by the manner in which the data representing speaker information is derived.

Alternatively or additionally, information based on the speaker recognition testing signal may comprise the speaker recognition testing signal as such.

The speaker recognition testing signal will also be referred to as a testing signal in the following.

For example, both the statistical analysis and/or used algorithms for deriving information based on the testing signal and for deriving information based on the speaker recognition enrollment data are usually determined by the type of speaker recognition for which the tamper-resistant element is adapted, i.e. the way the speaker recognition is to be carried out and when information based on a testing signal is considered to match the speaker information.

Checking whether information based on a testing signal matches the speaker information using speaker recognition is known from and may be done as described in the prior art, e.g. S. J. D. Prince, "Probabilistic linear discriminant analysis for inferences about identity" in ICCV-11$^{th}$; IEEE, 2007, pp. 1 or Dehak N, Kenny P, Dehak R, Dumouchel P, Ouellet P. "Front-End Factor Analysis For Speaker Verification; *Audio, Speech, and Language Processing, IEEE Transactions on.* 2010, both disclosing a text-independent speaker recognition approach, or M. F. BenZeghiba01 and H. Bourlard, "User customized HMM/ANN-based speaker verification", IDIAP-RR 01-32 or L. R. Rabiner and B.-H. Juang, *Fundamentals of Speech Recognition, Signal Processing*, A. Oppenheim, Series Ed. Englewood Cliffs, N.J.: Prentice-Hall, 1993, both disclosing a text-dependent speaker recognition approach.

For example, a comparison of the information based on the testing signal with the speaker information may allow a statistical calculation of the likelihood that the testing signal and the speaker recognition enrollment data were spoken by the same person according to the type of speaker recognition. The statistical treatment is due to the fact that there are natural fluctuations in the speech of each speaker such that the information based on two different speaker recognition testing signals of the same speaker are never exactly the same. A decision may then be rendered, e.g. by comparing the statistical estimation of the likelihood with a threshold value, and thus, it may be checked whether the information based on a testing signal matches the speaker information. The threshold value may e.g. be found by testing the type of speaker recognition with several training examples and deriving an appropriate threshold value, or the threshold value may be known or given for the type of speaker recognition.

The tamper-resistant element for use in speaker recognition may be adapted for use in speaker verification and/or speaker identification.

A tamper-resistant element according to the present disclosure may comprise a memory (e.g. RAM), storage memory (for example NVRAM, e.g. a flash card, or ROM) and a processor, or parts of it may be usable as memory, storage memory and a processor. It may be adapted to be connected or included into a computer system or other data processing system, e.g. via a card reader or cable or wireless connection, and it may be adapted to have data uploaded, preferably securely, into the tamper-resistant element, e.g. into the memory of the tamper-resistant element.

A tamper-resistant element according to the present disclosure is adapted for storing data representing speaker information based on speaker recognition enrollment data. Thus, the tamper-resistant element comprises some kind of storage memory in which data representing speaker information may be stored. Preferably all data representing speaker information, i.e. all data comprising information about the biometrical data of the enrolled speaker, is stored in the tamper-resistant element such that biometrical data cannot easily be compromised.

The tamper-resistant element is further adapted for checking whether information based on a testing signal matches the speaker information represented by the data stored in the tamper-resistant element. In particular, the tamper-resistant element typically comprises a processor capable of comparing the speaker information with information based on a testing signal for checking whether the information based on the testing signal matches the speaker information.

As the data representing speaker information is stored in the tamper-resistant element and as the checking of whether the information based on the testing signal matches the speaker information is done in the tamper-resistant element, the speaker information cannot easily be compromised because it is not handled outside of the tamper-resistant element. Additionally, the process of matching cannot be easily compromised either because it is done inside of the tamper-resistant element.

The tamper-resistant element is also adapted for carrying out a data integrity check. As this data integrity check is also done in the tamper-resistant element, tampering is not easily possible during this step. Herein, carrying out the data integrity check in a tamper-resistant element may comprise carrying out an entire data integrity check in the tamper-resistant element and/or carrying out at least one step of a data integrity check, typically (at least) the last one, e.g. the one using reference values which—if known to someone—may compromise the security of the tamper-resistant element, in the tamper-resistant element.

The presence of a (more) secure tamper-resistant element (in a usually less secure (or even unsecure) environment outside of the tamper-resistant element) may make a data integrity check for which a tamper-resistant element is adapted particularly useful. Such a data integrity check may reduce the risk that manipulated data is transferred from a less secure (or even unsecure) environment (outside of the tamper-resistant element) to the tamper-resistant element.

Typically, a tamper-resistant element is adapted for receiving data representing information derived from the testing signal (as information based on the testing signal). It may not be adapted for receiving the data representing the testing signal as such (e.g. because this may require too much bandwidth). Usually, the tamper-resistant element may be adapted for use in an environment or system where at least one step of processing the testing signal is done outside of the tamper-resistant element.

Data integrity in this context means that data has not been tampered with by anyone. For example, if data is modified, a breach of integrity should be noticed. Any unauthorized modification of data, whether deliberate or accidental, should typically be identified in a data integrity check. If a data integrity check indicates a breach of integrity, the corresponding testing signal is typically not considered further, and speaker recognition is typically not carried out.

A data integrity check may be done for any data comprising information based on a speaker recognition testing signal, e.g. it may be done for the testing signal and/or data derived therefrom, e.g. by a statistical analysis and/or by using pre-defined algorithms.

The tamper-resistant element may be adapted for storing data representing information for use in the data integrity check. The data representing information for use in the data integrity check may be stored in the storage memory (or memory) of the tamper-resistant element. It may comprise reference values, which may for example have been extracted from data integrity enrollment data, i.e. from audio samples recorded for that purpose, and/or from speaker recognition enrollment data. These reference values may be used for comparison with values derived from the speaker recognition testing signal. Alternatively or additionally, other check values, e.g. a nonce and/or an encryption key, may be stored in the tamper-resistant element (e.g. in the memory or storage memory) for checking whether the data representing information based on a speaker recognition signal follows an expected behavior.

The tamper-resistant element may be adapted for text-dependent speaker recognition or text-independent speaker recognition or a combination of text-dependent and text-independent speaker recognition. In text-dependent speaker recognition, the speaker must speak the same lexical content for both the enrollment and the recognition phases. In text-independent speaker recognition, no constraint is set between the lexical content used for enrollment and that of recognition.

A tamper-resistant element adapted for text-dependent speaker recognition may be adapted for use with a text-dependent Hidden Markov Model (HMM) approach to speaker recognition. A Hidden Markov Model approach to speaker recognition is known e.g. from Annex 5 or M. F. BenZeghiba01 and H. Bourlard, "User customized HMM/ANN-based speaker verification", IDIAP-RR 01-32 or L. R. Rabiner and B.-H. Juang, *Fundamentals of Speech Recognition, Signal Processing*, A. Oppenheim, Series Ed. Englewood Cliffs, N.J.: Prentice-Hall, 1993 and provides particularly good results for text-dependent approaches in speaker recognition.

A tamper-resistant element adapted for text-independent speaker recognition may be adapted for use with a text-independent i-vector-based speaker recognition approach. An i-vector-based speaker recognition approach is e.g. known from S. J. D. Prince, "Probabilistic linear discriminant analysis for inferences about identity," in ICCV-11$^{th}$. IEEE, 2007, pp. 1-8 or Dehak N, Kenny P, Dehak R, Dumouchel P, Ouellet P. Front-End Factor Analysis For Speaker Verification. *Audio, Speech, and Language Processing, IEEE Transactions on.* 2010 and provides particularly good results for text-independent approaches in speaker recognition.

The data integrity check may comprise an injection integrity check, i.e. it may comprise a check whether the testing signal (or data derived therefrom) has been substituted by a signal (or data derived therefrom) that had been previously produced an accepted matching, or could have previously produced an accepted matching (for example, replay attacks). An injection integrity check may e.g. be done as described in Annex 2.

Alternatively or additionally, the data integrity check may comprise a speaker recognition knowledge based integrity check, i.e. it may be checked that no data is modified taking advantage of the knowledge of the speaker recognition system, for example, by modifying data derived from the testing signal in a manner that will always lead to high matching results.

The tamper-resistant element may be adapted for storing, for example in the storage memory, information for use in the speaker recognition knowledge based integrity check. For example, integrity check vectors describing typical data or used to calculate correlations between parts of data may be stored in the tamper-resistant element for comparison with data or for calculating the correlations of parts of data derived from the testing signal to determine whether the data derived from the testing signal has been tampered with. Such integrity check vectors may be used to confirm or refuse that information based on the testing signal shows the expected behavior.

The tamper-resistant element may be adapted for carrying out a spoof check. For carrying out a spoof check, features may be extracted (derived) from a testing signal or data derived therefrom. A spoof check may e.g. be carried out as described in the European patent application with reference number 13 185 783.1 (Anti-Spoof) filed by Agnitio or as described in Annex 1. U.S. patent application Ser. No. 14/083,942, which is incorporated herein by reference, claims priority to European Patent Application No. 13 185 783.1 and also describes how to carry out a spoof check. Herein, carrying out the spoof check in a tamper-resistant element may comprise carrying out an entire spoof check in the tamper-resistant element and/or carrying out at least one step of a spoof check, typically (at least) the last one, e.g. the one using reference values which—if known to someone—may compromise the security of the tamper-resistant element, in the tamper-resistant element.

Information for carrying out a spoof check may be stored in the storage memory of the tamper-resistant element. For example, an anti-spoof model or relevant parameters thereof may be stored in such a storage memory. Storing such a model or model parameters in the tamper-resistant element has the advantage that it (they) cannot be easily tampered with or read out from outside of the tamper-resistant element. Preferably, all data representing information which may allow inferring which data will achieve a positive result in the spoof (and/or data integrity) check will be stored in the tamper-resistant element. Thus, the stored information or model will not be compromised easily.

The tamper-resistant element may be adapted to carry out a spoof and/or a data integrity check in the tamper-resistant element, thus also decreasing the likelihood that the anti-spoof model and/or parameters thereof and/or the data for use in the data integrity check will be compromised.

The tamper-resistant element may be adapted to carry out an injection integrity check for example for the data, e.g. features, to be used for a spoof check, typically when it is transferred into the tamper-resistant element and/or for any other data transferred into the tamper-resistant element.

The invention further comprises a system comprising a tamper-resistant element as described before. The system may e.g. be a computer system and/or comprise a card reader. It may in particular comprise a processor and/or memory and/or storage memory outside of the tamper-resistant element. The part outside of the tamper-resistant element is typically less secure than the tamper-resistant element, e.g. it may be easier accessible from the outside. However, typically, it is still a protected environment, e.g. a password protected and/or encrypted computer or server.

The system may be adapted for deriving information based on the testing signal from the testing signal outside of the tamper-resistant element, e.g. by a statistical analysis and/or by using pre-defined algorithms. Thus, processing steps requiring high processing resources may be done outside of the tamper-resistant element which typically has only small processing resources and/or the size of the data file(s) that need to be uploaded onto the tamper-resistant element may be reduced by processing the data to provide smaller data file(s), e.g. deriving data by a statistical analysis and/or by using pre-defined algorithms before it is uploaded to the tamper-resistant element to decrease the size of the data to be uploaded.

For example, steps using hyperparameters, i.e. parameters describing the type of speaker recognition, wherein the hyperparameters do not give sufficient information about how to manipulate the testing signal or information based on the testing signal in order to manipulate the results of the speaker recognition (non-critical hyperparameters) may be done outside of the tamper-resistant element. Additionally or alternatively, steps requiring many processing resources may be done outside of the tamper-resistant element to reduce the resources necessary in the tamper-resistant element.

One, two, three or more hyperparameters may additionally be stored outside of the tamper-resistant element. Typically, the hyperparameters stored outside of the tamper-resistant element are hyperparameters that do not give sufficient information about the model to easily manipulate the results of the speaker recognition (non-critical hyperparameters), e.g. hyperparameters describing the statistical analysis and/or pre-defined algorithms used for deriving information based on the testing signal from the testing signal that do not allow inferring any information about how to achieve a matching result in the absence of the speaker information which is typically stored in the tamper-resistant element.

Accordingly, one, two, three or more parameters comprising information about the optional spoof check and/or the data integrity check which do not give sufficient information about how to manipulate the testing signal or information based on the testing signal in order to manipulate the results of the optional spoof check or the data integrity check (non-critical parameters) may be stored outside of the tamper-resistant element, and the system may optionally be adapted to carry out steps using these parameters to derive information based on the testing signal outside of the tamper-resistant element.

The system may be adapted for uploading information based on the testing signal derived from the testing signal outside of the tamper-resistant element to the tamper-resistant element. Thus, the bandwidth necessary for the upload and the required memory of the tamper-resistant element may be reduced because the statistical data derived from the testing signal may require less memory than the entire testing signal and uploading it may require less bandwidth than uploading the entire speaker recognition testing signal.

Alternatively or additionally, the tamper-resistant element may be adapted for deriving information based on the testing signal and/or information derived from information based on the testing signal from data uploaded from outside of the tamper-resistant element, e.g. by a statistical analysis and/or by a pre-defined algorithm A tamper resistant element may be adapted for carrying out one, two, three or more processing steps of information based on the testing signal in addition to the above-mentioned checks of matching, data integrity and optional spoof check.

This may for example be useful when the tamper-resistant element provides sufficient processing resources to carry out the steps inside the tamper-resistant element. It may be particularly advantageous because it may decrease the likelihood of speaker recognition knowledge based integrity breaches. Any steps carried out in the tamper-resistant element will not be easily attackable from outside of the tamper-resistant element.

In the entire discussion, it is assumed that the testing signal has been received by the system or the tamper-resistant element in a secure manner, for example, through an encrypted signal, or a verified channel, a secure recording module or means protected by law, e.g. telephones, or any other secure manner.

The system may be adapted for deriving information necessary for carrying out an injection integrity check and/or a spoof check of the testing signal outside of the tamper-resistant element.

The system may be adapted for carrying out 1, 2, 3 or more steps of deriving information based on a testing signal from the testing signal outside of the tamper-resistant element. For this, 1, 2, 3, or more different modules, i.e. separate system parts may be used.

Deriving information based on a testing signal from the testing signal outside of the tamper-resistant element may in particular comprise carrying out—outside of the tamper-resistant element—1, 2, 3, or more steps of deriving information based on a testing signal for use in the speaker recognition and/or of deriving features of the testing signal for carrying out the spoof check and/or of deriving information to be used for a data integrity check based on the testing signal, e.g. an injection or speaker recognition knowledge based integrity check.

The system may be adapted for deriving information based on the testing signal for checking whether information based on a testing signal matches the speaker information, i.e. deriving information for speaker recognition, outside of the tamper-resistant element in parallel to deriving information necessary for carrying out the spoof check (features) from the speaker recognition signal outside of the tamper-resistant element. The information necessary for carrying out the spoof check is typically also information based on the speaker recognition testing signal.

For example, the information based on the testing signal for checking whether the speaker information matches the information based on the testing signal may be derived in a step separate from extracting information necessary for a spoof check.

The system may be adapted for maintaining data integrity of data representing information based on the speaker recognition system testing signal and/or any data derived from the speaker recognition system testing signal outside of the tamper-resistant element and usually also during the transfer to the tamper-resistant element.

In particular, it may be adapted for maintaining the data integrity; e.g. injection integrity, of any data handled outside of the tamper-resistant element and/or during upload into the tamper-resistant element, in particular for example if the integrity has been checked or will not be checked (again) at a later time in a system.

Typically, any communication between two modules of the system outside of the tamper-resistant element, i.e. between two separate system parts, e.g. parts performing steps in the processing of data for use in speaker recognition and/or when uploading data into the tamper-resistant element are usually adapted to maintain the data integrity, in particular injection integrity (e.g. to check it as e.g. disclosed in Annex 2).

In any communication between two modules of the system outside of the tamper-resistant element, i.e. between two separate system parts, e.g. parts performing steps in the processing of data for use in speaker recognition and/or when uploading data into the tamper-resistant element the system may additionally be adapted for checking the speaker recognition knowledge based integrity, e.g. by considering correlations between parts of the uploaded data and checking whether these follow the expected behavior.

For example, if the information necessary for the injection integrity check is derived separately from deriving information based on the testing signal used for the matching with the speaker information, injection integrity must be maintained in processing steps where the testing signal or information derived therefrom is dealt with outside of the tamper-resistant element.

The system may be adapted for maintaining data injection integrity by using cryptographical means, for example, a cryptographical nonce, and/or digital signature schemes or other means of data protection, e.g. as described in Annex 2. It may in particular be adapted for carrying out a data integrity check when transferring data from one module to another outside of the tamper-resistant element and/or when transferring data from one module into the tamper-resistant element.

Typically, in a system according to the invention, cryptographic keys and/or cryptographical nonces and/or digital signature keys are generated in a secure module or element, i.e. a system part which is considered secure, or extracted from a secure module or element.

A system according to the invention may be adapted such that before any communication is carried out outside of the tamper-resistant element, a testation is required in order to be sure that all modules (i.e. parts of the system e.g. adapted for handling data) are what they say to be.

Some or all hyperparameters and/or information for use in the data integrity check may be stored inside of the tamper-resistant element, thus reducing the risk of compromising said data during use. Preferably, all hyperparameters describing the type of speaker recognition and/or the information for use in the data integrity check and/or spoof check (e.g. the anti-spoof model) allowing an inference about biometrical data and/or how to manipulate data in order to achieve positive matching or integrity or spoof check results is saved in the tamper-resistant element. Additional (non-critical) information may also be stored in the tamper-resistant element.

As previously explained, a tamper-resistant element or system comprising a tamper-resistant element may be adapted for text-dependent and text-independent speaker recognition. It may also be adapted for a combination of text-independent and text-dependent speaker recognition. For example, when using text-independent and a text-dependent speaker recognition, the scores derived thereof may be combined, for example, by linear combination. A tamper-resistant element may be adapted to carry out such a combination inside of the tamper-resistant element, thus avoiding any tampering with the results of the text-independent and text-dependent speaker recognition system.

Using a previously described system for speaker identification may use a tamper-resistant element that in terms of storage memory, memory and processor as well as bandwidth is capable of processing several enrolled speakers. Alternatively, a system may be adapted to comprise two or more tamper-resistant elements, wherein one separate tamper-resistant element is used for each enrolled speaker, or one, two, three, or more tamper-resistant elements are used, which each store information for one, two, three, or more enrolled speakers.

The invention further comprises a method for speaker recognition comprising the steps of storing data representing speaker information based on speaker recognition enrollment data in a tamper-resistant element, checking whether information based on a testing signal matches the speaker information, characterized in that the method also comprises carrying out a data integrity check in the tamper-resistant element.

The tamper-resistant element used in such a method for speaker recognition may be a tamper-resistant element as described above and/or such a method may be used in a system as described above.

The method may additionally comprise any of the steps for which the tamper-resistant element is adapted and/or for which the system is adapted.

The present disclosure further comprises a computer readable medium that comprises computer readable instructions that, when executed in a processor, cause the steps of a before described method to be carried out.

DETAILED DESCRIPTION OF THE PREFERRED EMBODIMENTS

Figure 1:
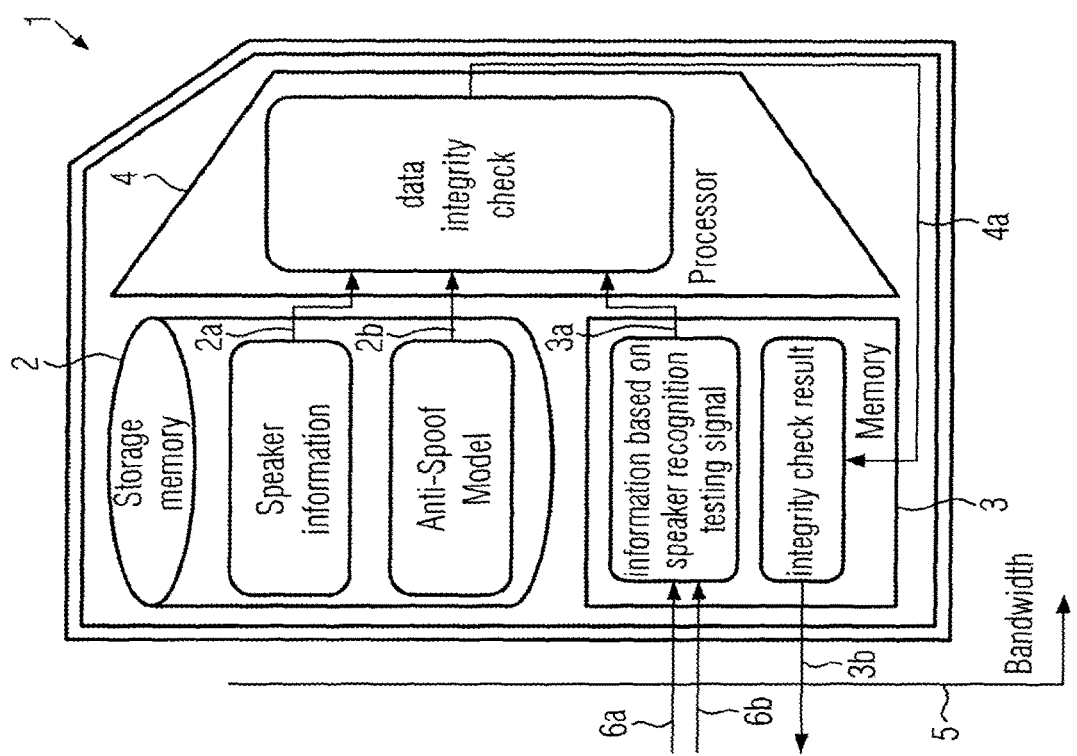
FIG. 1 shows an exemplary tamper-resistant element.

FIG. 1 shows an exemplary tamper-resistant element 1. Such a tamper-resistant element may comprise a storage memory 2, e.g. NVRAM, e.g. flash memory, or ROM, memory 3, e.g. RAM, and a processor 4. Herein, the tamper-resistant element is shown as a SIM card, which may e.g. be used in cell phones. However, different types of tamper-resistant elements may also be adapted for the invention, e.g. tamper-resistant elements of the type which are e.g. used for credit or debit cards, etc.

In tamper-resistant elements, it is usually possible for the processor 4 to access data from storage memory 2 (indicated by arrows 2a, 2b) and memory 3 (indicated by arrow 3a) and process it in the processor 4. The processor 4 can write results of the processing operation into memory 3 (herein indicated by arrow 4a). The data from the memory 3 can be transferred out of the tamper-resistant element 1 (indicated by arrow 3b), and data from outside of the tamper-resistant element can be transferred into the tamper-resistant element (indicated by arrows 6a, 6b).

Some tamper-resistant elements may have a limited bandwidth 5 and/or the capabilities of the processor 4 may be limited compared to a processor as used in devices like a computer. Additionally, the storage memory 2 and the memory 3 may also be more limited than memory and storage memory in devices like computers.

Therefore, some embodiments of systems according to the invention may be adapted for deriving information based on the (speaker recognition) testing signal from the testing signal outside of the tamper-resistant element. For example, information based on the testing signal for checking whether the information matches the speaker information may be derived from the testing signal outside of the tamper-resistant element and/or information necessary for carrying out a spoof and/or data integrity check, e.g. a speaker recognition knowledge based integrity check, may be derived from the testing signal outside of the tamper-resistant element. Typically, information necessary for carrying out the spoof check and/or the data integrity check is also information based on the speaker recognition testing signal. Then, the derived information may be transferred into the tamper-resistant element, as indicated by arrows 6a and 6b.

In the tamper-resistant element shown in FIG. 1, data representing speaker information is shown in the storage memory 2. In addition, optionally present data representing information for use in the optional spoof check, in this particular example an anti-spoof model, is also shown in storage memory 2. In other embodiments, instead of or in addition to an anti-spoof model, other data representing information for use in the data integrity check or no data representing information for use in the data integrity check may be stored in the storage memory 2 and accordingly be transferred to or accessed by the processor 4.

The tamper-resistant element according to the invention is adapted for carrying out a data integrity check, in this example for the processor 4 to carry out a data integrity check, and for checking whether information based on a speaker recognition testing signal matches the speaker information (not shown in FIG. 1). An optional spoof check may also be carried out (e.g. by processor 4)(not shown in FIG. 1).

Then, the result of the checking (not shown), the result of the data integrity check, and optionally also the result of an optional spoof check (not shown) are typically transferred from the processor 4 to memory 3 (indicate by arrow 4a) and from there may optionally be transferred out of the tamper-resistant element (indicated by arrow 3b).

Each result may be a score or a decision. If a result is a decision, a corresponding threshold may be stored in the tamper-resistant element, e.g. in the storage memory 2 and the processor 4 may compare the score against the threshold to compute the result. In other embodiments, a score may be transferred out of the tamper-resistant element, e.g. for comparing to a threshold outside of the tamper-resistant element.

Figure 2:
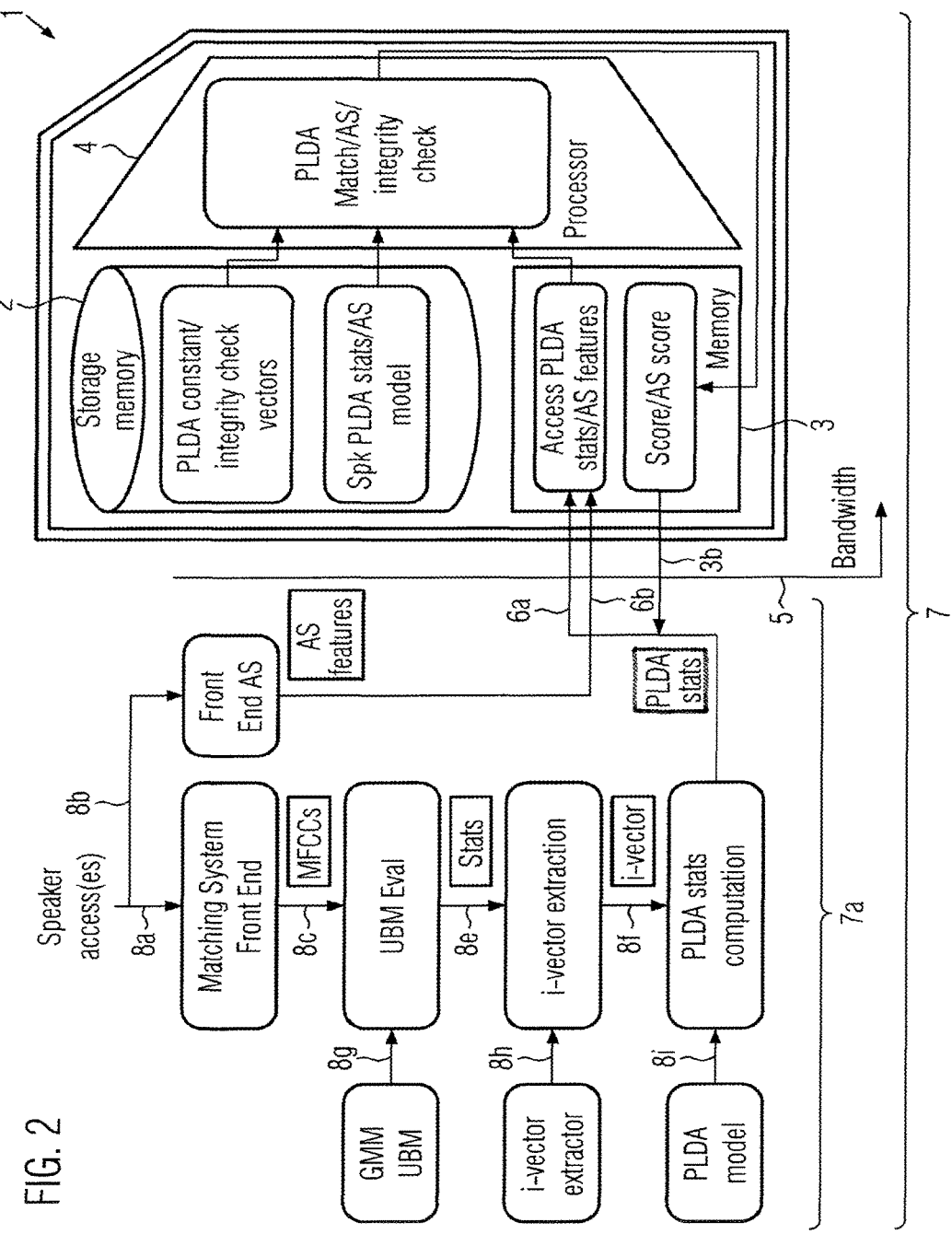
FIG. 2 shows an exemplary speaker recognition system which may be used for text-independent speaker recognition.

FIG. 2 shows an exemplary system 7 for text-independent speaker recognition. In particular, the system comprises a tamper-resistant element 1 comprising storage memory 2, memory 3 and a processor 4 and a part outside of the tamper-resistant element 7a.

In this particular example, a testing signal is inserted into the system via a speaker access (or speaker accesses). Then, the testing signal is transferred to a matching system front end (indicated by arrow 8a) and parallel to the transfer to the matching system front end is transferred to a front end of an anti-spoof system (Front EndAS)(indicated by arrow 8b).

In some embodiments, instead of a spoof check, or in addition to a spoof check, the system and/or the tamper-resistant element may be adapted for carrying out other checks and may comprise additional or different corresponding front ends outside of the tamper-resistant element and/or may use information based on the testing signal in the matching system front end.

Figure 3:
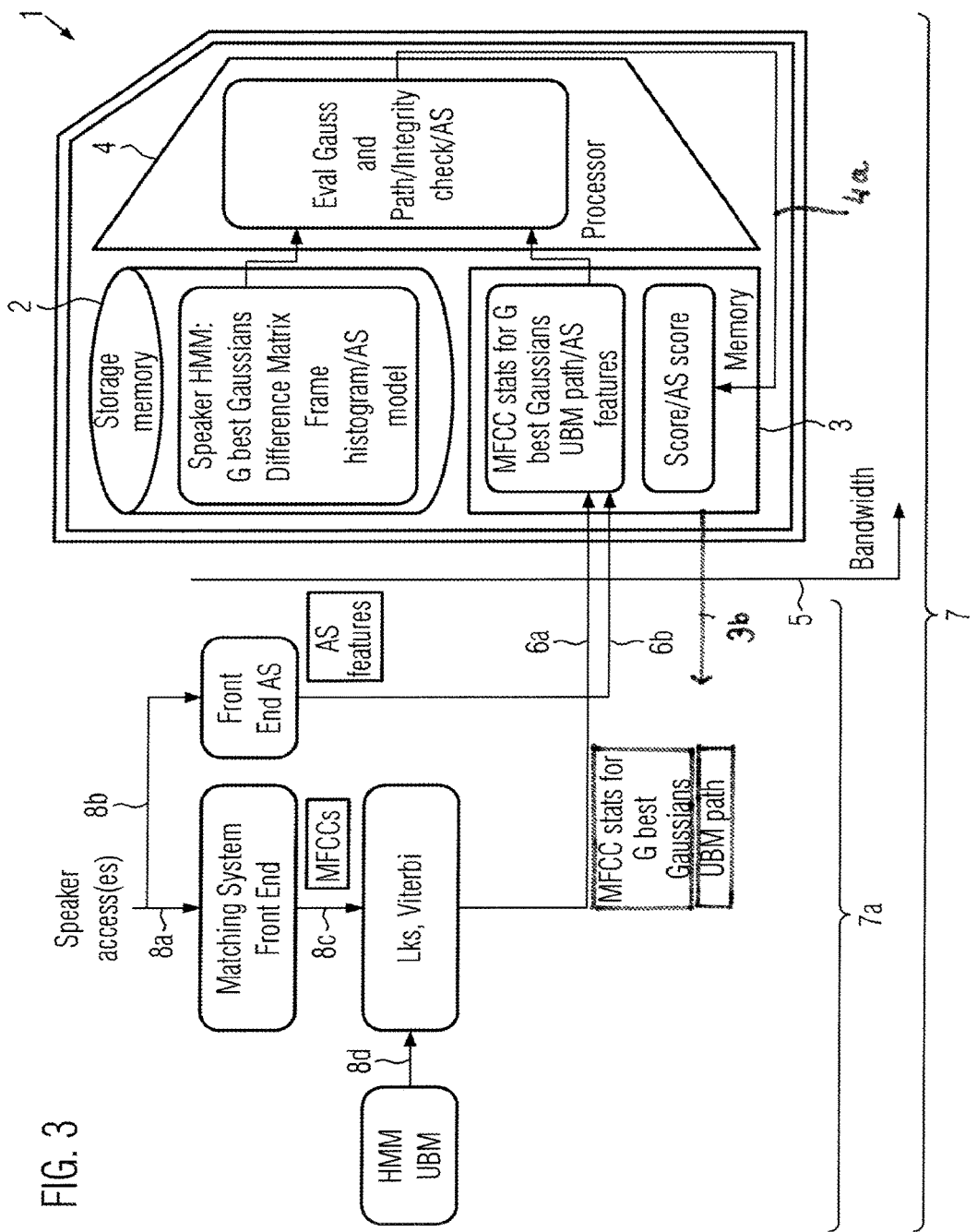
FIG. 3 shows an exemplary speaker recognition system which may be used for text-dependent speaker recognition.

A data integrity check, in particular an injection integrity check and/or speaker recognition knowledge based integrity check, and an optional spoof check, may be present in text-dependent and/or in text-independent speaker recognition, e.g. as also shown in FIG. 3.

In the front End AS, the system derives information from the testing signal to be used in the spoof check. In this example, the testing signal received by the speaker access(es) are transformed into a set of features for use in the spoof check (in this particular case called AS features). The system may be adapted for transferring this set of features (AS features) into the memory 3 of the tamper-resistant element 1 (indicated by arrow 6b). Based on these features (AS features) and based on information for use in the spoof check (in this particular example an anti-spoof model, AS model), the processor 4 can then carry out a spoof check, i.e. a check whether the testing signal is spoof or not using the AS model. An exemplary anti-spoof solution which may be used is enclosed as Annex 1. Another anti-spoof solution which may alternatively used can be found in the European patent application 13 185 783.1 filed by Agnitio.

The result of this spoof check may be written into the memory 3 by processor 4, e.g. in the form of a score (AS score) and may optionally be transferred out of the tamper-resistant element 1, e.g. into a part of the system outside of the tamper-resistant element 7a (indicated by arrow 3b) or it may optionally be compared to a threshold (which may for example be stored in storage memory 2) to give a final result (spoof or non-spoof)(not shown).

When transferring the testing signal from the speaker access(es) to the front end AS (arrow 8b) and the AS features to the memory 3 of the tamper-resistant element (arrow 6b), data integrity, e.g. injection integrity should be conserved (ensured) to avoid an injection of data giving a positive matching. This may e.g. be done by cryptographical means, e.g. a cryptographical nonce, and/or digital signatures or other means for ensuring data integrity.

An example for steps ensuring data integrity, in particular injection integrity (an injection integrity check), when transferring data between two modules, e.g. from speaker access(es) to the front end as or from the front end as to memory 3 is given in Annex 2.

For example, injection integrity may be maintained between all modules (shown as boxed modules) outside of the tamper-resistant element and/or when transferring data into the tamper-resistant element. For example, the injection integrity of all variable shown as boxed (MFCCs, Stats, i-vector, PLDA stats and AS features) may usually be maintained.

In the following, an exemplary solution for text-independent speaker recognition is explained. In other embodiments, one, two, three or more of the modules may not be present or may be replaced by other modules and the parameters correspondingly calculated may be different than in the explained example.

In the matching system front end, a testing signal is received from speaker access(es) as indicated by arrow 8a. Then, in the matching system front end (a module) the testing signal is transformed into a first information based on the speaker recognition testing signal, e.g. a set of parameters, e.g. features vectors, in this particular example indicated as MFCCs (as for example disclosed in S. B. Davis, and P. Mermelstein, "Comparison of Parametric Representations for Monosyllabic Word Recognition in Continuously Spoken Sentences" in *IEEE Transactions on Acoustics, Speech, and Signal Processing*, 28(4), pp. 357-366. 1980).

The dimension of the used MFCC can vary depending on the application, for example 60 may be a useable value. Then, these MFCCs are transferred into an UBM evaluation module (UBM Eval)(as shown by arrow 8c). In the UBM evaluation module, the information about the UBM, here exemplarily a GMM obtained during a previous developing phase, are already present or transferred from another module (as shown herein by arrow 8g), the exemplary GMM UBM module. A GMM may e.g. be composed of 256, 512, 1024, 2048 Gaussians. In the UBM Evaluation module (UBM Eval) the statistics (Stats) are computed, which are also information based on the speaker recognition testing signal.

These Stats may then be transferred into an i-vector extraction module (as shown by arrow 8e). In the i-vector extraction module, the i-vector extractor information is already present or transferred from another module, in this example, the exemplary i-vector extractor module (as shown by arrow 8h). The i-vector extractor information has typically been obtained during a development phase.

In the i-vector extraction module, the i-vector (which may typically have 400, 500 or 600 dimensions) may be computed and provided to another module, in this example a Probabilistic Linear Discriminant Analysis stats computation module (PLDA stats computation module)(as shown by arrow 8f).

In that module, the information of the PLDA model is already present or transferred from another module, in this example the PLDA model module (as shown by arrow 8i). Then, the PLDA statistics (PLDA stats) are computed in the PLDA stats computation module. Such PLDA statistics is e.g. known from S. J. D. Prince, "Probabilistic linear discriminant analysis for inferences about identity," in ICCV-11$^{th}$. IEEE, 2007, pp. 1-8. In this example the GMM UBM, i-vector extractor and PLDA model modules comprise hyperparameters. However, these hyperparameters do not typically allow inferring how a signal is to be modified to achieve a match and may thus be stored outside of the tamper-resistant element.

In other embodiments, the GMM UBM, i-vector extractor and/or PLDA model modules and/or PLDA stats computation, i-vector extraction and/or UBM Eval may be done inside the tamper-resistant element. For transfers of data inside the tamper-resistant element, a data integrity check may not be necessary (however, nevertheless possible), but a data integrity check is usually needed and usually carried out when uploading data into the tamper-resistant element.

When transferring the testing signal from the speaker access(es) to the matching system front end (arrow 8a) and data from there on between modules (along arrows 8c, 8e, 8f) and from the system modules comprising hyperparameters (along arrows 8g, 8h, 8i) and/or to and from the Front End As (8b, 6b) and/or from the PLDA Stats computation to the Memory 3 (arrow 6a) the system is typically adapted for conserving data integrity, e.g. injection integrity to avoid an injection of data giving a positive matching. This may e.g. be done by cryptographical means, e.g. a cryptographical nonce, and/or digital signatures or other means for ensuring data integrity by injection attacks. This may e.g. be done as described in Annex 2.

The PLDA stats are then transferred to the memory 3 of the tamper-resistant element 1 (as indicated by arrow 6a pointing to PLDA Stats). In other embodiments, instead of or in addition to PLDA stats other information based on the testing signal is transferred to the memory 3 (not shown).

In the tamper-resistant element adapted for checking whether information based on a speaker recognition testing signal, here, exemplarily the PLDA stats, matches the speaker information, here exemplarily PLDA constant, a score may be generated describing whether the information based on the testing signal matches the speaker information. In this particular example, this may be done by combining the PLDA constant, enrollment PLDA stats (Spk PLDA stats in Storage memory 2) with the testing PLDA statistics computed in the PLDA stats computation module.

An example of how the score of a PLDA system can be obtained from the PLDA statistics from testing, enrollment and PLDA constant is given in Annex 3. The score may be generated in processor 4 (PLDA Match), generating a score, which may be stored in the memory 3 and/or transferred outside the tamper-resistant element 1 (indicated by arrow 3b). The score can be optionally compared to a threshold to give a final result. In that case, the threshold may be stored in the Storage memory 2.

A system according to the invention, in particular the tamper-resistant element, may be adapted for checking the speaker recognition knowledge based integrity of the information based on the speaker recognition signal or information derived therefrom for speaker recognition, e.g. PLDA stats, transferred into the memory to avoid a manipulation of these statistics based on the knowledge of the speaker recognition system in order to give a positive match. An example of how to perform such a speaker recognition knowledge based integrity check is given in Annex 4.

In the exemplary system disclosed in FIG. 2, the PLDA constant, the integrity check vectors, the speaker PLDA stats (Spk PLDA stats) and the AS model are preferably all stored in the tamper-resistant element for security reasons. They are preferably also used inside the tamper-resistant element only (as indicated in FIG. 2) because they typically comprise data which—when compromised—may facilitate security breaches in the speaker recognition system and/or the loss of which will disclose biometrical data to unauthorized individuals or systems thus compromising the confidentiality expected of a speaker recognition system. The data integrity check is typically carried out in the processor 4 (Integrity check).

The requirements for an above-mentioned system or tamper-resistant element may be small enough to allow for example the use of a SIM card as tamper-resistant element.

A tamper-resistant element adapted for text-independent speaker recognition or a system for text-independent (as e.g. explained in FIG. 3) speaker recognition may be adapted for use with an i-vector approach using a PLDA model, e.g. one PLDA model for both male and female speakers.

Alternatively, a tamper-resistant element adapted for text-independent speaker recognition may be adapted to use two different PLDA models, one for male speakers and one for female speakers, since they are gender dependent. Under those circumstances, two scores may be obtained independently, e.g. as it was explained and after that they are usually fused using a linear combination considering the score provided by a Gender IDentification module (GID). An example for a GID is disclosed in M. Senoussaoui, P. Kenny, P. Dumouchel, and N. Dehak, "New Cosine Similarity Scorings to Implement Gender-independent Speaker Verification," Proc. Interspeech, pp. 2773-2777, Lyon, France, August 2013.

Note that the gender detection may be computed outside the tamper-resistant element and transmitted to the tamper-resistant element, since it is typically not critical in the sense that usually the optimal value for it to get the highest score is to match the gender score of the speaker information of the enrolled speaker. Furthermore, the gender score for the enrolled speaker is unknown, and even if it were known, a perfect match of the gender score is far to achieving an acceptance. Therefore it may not be important to check its integrity and/or carry out the gender detection in the tamper-resistant element.

The methodology proposed in the previous example for a speaker recognition Knowledge based integrity check may be applied to each gender dependent PLDA system as indicated above. However, additionally or alternatively, it may be improved taking into account that both systems are related since their input i-vector is identical, although the complexity of the integrity check validating would increase across gender dependent PLDAs.

The above-described example, which does not provide any accuracy degradation, was designed to be applied even in the simplest tamper-resistant element, e.g. a smart card, e.g. a SIM card.

However, other options could be defined when the limitations of the tamper-resistant element are not so restrictive. Effectively, the "i-vector", "stats", "MFCCs", "AS features" and/or "Speaker access(es)" (look at FIG. 2) could be transmitted to the tamper-resistant element. In that case, no integrity check would be needed, the bandwidth (as shown by arrow 5) should be increased depending the size of i-vector, stats, the feature vectors or the audio; furthermore the processor, storage memory and memory should be adapted to run in the tamper-resistant element not only the matching and carrying out the anti spoofing solution (spoof check), but also the "PLDA stats computation", "i-vector extraction", "UBM Eval", "Matching System Front End" and/or "Front End AS". Typically, the elements transmitted to the tamper-resistant element still allow a timely and reasonable speaker recognition in view of the features and capabilites of the tamper-resistant element.

The exemplary solution described above may be implemented for speaker verification, or for speaker identification without loss of generality. For example, one tamper-resistant element may be used for each enrolled speaker, or more tamper-resistant elements may be used, each for one or more speakers, or just one for all of them, if the tamper-resistant element characteristics in terms of storage memory, memory, processor and bandwidth are high enough.

FIG. 3 shows a system 7 adapted for text-dependent speaker recognition. As the system of FIG. 2 it comprises a tamper-resistant element 1 and a part outside of the tamper-resistant element 7a.

In general, a tamper-resistant element 1 or system 7 adapted for text-dependent speaker recognition may be adapted for speaker recognition based on Hidden Markov Models (HMMs). A short introduction into HMMs can e.g. be found in L. R. Rabiner, "A tutorial of Hidden Markov Models and selected applications in speech recognition", Proc. Of IEEE77 (2): 257-286. Doi: 10.1109/5. 18626. [1] and also in Annex 5.

In a tamper-resistant element or system adapted for text-dependent speaker recognition based on HMMs, no assumptions may be made that reduce the accuracy. In other embodiments, however, one, two, three or all of the following assumptions that might reduce the accuracy may be made in order to decrease the necessary resources:

During the recognition phase (testing), the likelihood of a GMM (Gaussian Mixture Model) associated to a state may be approximated as the likelihood of the best Gaussian of that GMM (i.e. the highest likelihood of a Gaussian in the GMM).

Additionally or alternatively, it may be assumed that the extracted MFCCs, the optimal sequence of states or paths after Viterbi decoding for the HMM-UBM and for the speaker HMM are identical.

Alternatively or additionally, G Gaussians of the HMM-UBM may be considered significantly adapted to the speaker, such that only those Gaussians may be evaluated in some embodiments. They may e.g. be selected during enrollment according to the number of feature vectors that are associated to the Gaussians.

The speaker HMM model may be built using a MAP adaptation, uploading only the mean feature vectors and the transition probabilities matrix, wherein the mean adaptation may be modeled as an offset.

The invention also comprises a system adapted for speaker recognition and a method for speaker recognition using a HMM based approach of speaker recognition characterized in using one, two, three or all the above-mentioned assumptions.

In the particular example shown in FIG. 3 all of the above-mentioned assumptions are made. The particular example is based on HMMs, the system comprises a matching system Front End module, e.g. as the one in FIG. 2, adapted for transforming the speaker recognition testing data into a set of feature vectors, e.g. MFCCs (as shown in this particular example). The transfer of the testing signal (Speaker access(es)) into the matching system Front End module is indicated by arrow 8a.

Given the feature vectors, in this example the MFCCs, and the UBM, in this example a HMM (which has typically been obtained in a developing phase), a suitable algorithm, in this particular example e.g. Viterbi algorithm may be applied using the HMM-UBM and the MFCCs in a module (the input of the MFCCs indicated by arrow 8c, and of the HMM-UBM by arrow 8d), in this example the Lks, Viterbi module. A typical size of MFCC vectors may be 60 or around 60.

In this step, the MFCC statistics (stats) for the Gaussians of the HMM UBM (an exemplary size of the HMM-UBM may e.g. be 20, 30, or 40 states with e.g. 4, 8 or 16 components, i.e. Gaussians, per state), for example for the G best Gaussians defined during enrollment, and the corresponding sequence of states, i.e. MFCC stats for G best Gaussians and the UBM path, respectively, may be computed and the data representing the MFCC statistics and the UBM path may be uploaded to the memory 3 of the tamper-resistant element (as indicated by arrow 6a). Then, the data representing the MFCC statistics and the UBM path may be transmitted to or accessed by the processor 4 of the tamper-resistant element. The processor 4 is in this example also adapted for carrying out a data integrity check of the data representing the MFCC statistics and the UBM path, in particular e.g. a speaker recognition knowledge based integrity check, to verify that the data has not been modified. Such a check may e.g. be carried out as described in Annex 7. For this check, data representing a Frame histogram may be accessed by the processor 4 and used. The data representing a Frame histogram may e.g. be stored in the storage memory 2 of the tamper-resistant element.

When transferring the testing signal from the speaker access(es) to the matching system front end (arrow 8a) and data from there on between modules (along arrow 8c) and from the system modules comprising hyperparameters (e.g. along arrows 8d) and/or between other modules outside of the tamper-resistant element (e.g. along 6a, 6b, 8b) the system is typically adapted for conserving data integrity, e.g. injection integrity to avoid an injection of data giving a positive matching. This may e.g. be done by cryptographical means, e.g. a cryptographical nonce, and/or digital signatures or other means for ensuring data integrity. This may e.g. be done as described in Annex 2.

The tamper-resistant element is adapted for checking whether the information based on a testing signal matches the speaker information, e.g. by deriving a score by combining the MFCC stats for the G best Gaussians and the UBM path with the enrollment voice print (corresponding to speaker information: Speaker HMM: G best Gaussians and Difference Transition Matrix), as explained e.g. in Annex 6. It is usually carried out in the processor (Eval Gauss and Path), generating a score (Score) (indicated by arrow 4a), which may be stored in memory and/or can be provided to the outside of the tamper-resistant element (indicated by arrow 3b). The score can be optionally compared to a threshold to give a final result. In that case, the threshold may e.g. be stored in the Storage memory.

Additionally, in parallel to the Matching system front end deriving the MFCCs a Front End AS may (similar to or as shown in FIG. 2) extract the AS features from the testing signal and transfer the data to memory 3 of the tamper-resistant element. The anti-spoof solution may be similar or correspond to the one of FIG. 2. In particular, the AS model may be stored in the tamper-resistant element (e.g. the storage memory) for data security reasons. It may be used inside the tamper-resistant element only (as indicated in FIG. 3) because it may comprise data which—when compromised—may facilitate security breaches in the speaker recognition system. The anti spoofing score (an example of a result of a spoof check) may be obtained in the processor 4 (AS) and stored in memory 3 (AS score) (indicated by arrow 4a) and/or may be provided to the outside of the tamper-resistant element (indicated by arrow 3b). The score may optionally be compared to a threshold to give a final result. In that case, the threshold may e.g. be stored in the Storage memory 2.

The exemplary solution might degrade the accuracy of the system because of previously mentioned assumptions. The system was designed to be applied even in the simplest tamper-resistant element.

In a speaker recognition system, 1, 2, or 3 of the above-mentioned assumptions may not be made, e.g. when the limitations of the tamper-resistant element are not so restrictive. Effectively, e.g. the "MFCCs" and/or "speaker access(es)" (as e.g. shown in FIG. 3) could be transmitted to the tamper-resistant element. In that case, no speaker recognition knowledge based integrity check would be needed, the bandwidth (as shown by arrow 5) should be increased (higher than in other embodiments) depending the size of the feature vectors or the audio(s); furthermore the processor, storage memory and memory of the tamper-resistant element should be adapted to run not only the matching and optional spoof check, but also the "Lks, Viterbi", "Matching Front End" and/or "Front End AS" (FIG. 3), depending on the case. If the resource of the tamper-resistant element allows, the four assumptions that might reduce the accuracy mentioned above could also be relaxed, i.e. one, two, three or four of them may not be made, in order to improve the accuracy.

The exemplary solution described above may be implemented for speaker verification, or for speaker identification without loss of generality. For example, one tamper-resistant element may be used for each enrolled speaker, or more tamper-resistant elements may be used, each for one or more speakers, or just one for all of them, if the tamper-resistant element characteristics in terms of storage memory, memory, processor and bandwidth are high enough.

Annex 1: Anti Spoof Solution

An exemplary anti spoofing solution (for carrying out a spoof check) is based on computing a likelihood ratio (LR in eq. (1)). It is extracted from a feature vector, y computed from the testing signal in eq. (1) ("AS features" shown e.g. in FIG. 2 or 3, which is a $N_{AS}$ dimensional vector), and two Gaussian models $N(y; \mu_{(non-)spoof}, \Sigma_{(non-)spoof})$ ("AS model" e.g. in FIGS. 2, 3), one that represents non-spoof data and other that represents spoof data (which is typically stored in the tamper-resistant element):

$$LR = \frac{N\left(y; \mu_{spoof}, \sum_{spoof}\right)}{N\left(y; \mu_{non-spoof}, \sum_{non-spoof}\right)} \quad (1)$$

where $\mu_{spoof}$ and $\Sigma_{spoof}$ are the mean vector and the diagonal covariance matrix for the spoof model, and $\mu_{non-spoof}$ and $\Sigma_{non-spoof}$ are the mean vector and the diagonal covariance matrix for the non-spoof model, which are typically also speaker dependent and they are typically obtained during enrollment.

The anti spoofing feature vector is composed of different metrics, for example by the spectral ratio, low frequency ratio and feature vector squared Mahalanobis distance. In this example, $N_{AS}$=3. Alternatively other metrics could also be included or one or two of the metrics may be replaced by other metrics or omitted entirely.

The spectral ratio may for example be the ratio between the signal energy from 0 to 2 KHz and from 2 KHz and 4 KHz. Thus, given a frame l of the audio access x(n), the spectral ratio may be calculated as:

$$SR(l) = \sum_{f=0}^{\frac{NFFT}{2}-1} 20\log_{10}(|X(f,l)|)\sqrt{\frac{4}{NFFT}}\cos\left(\frac{(2f+1)\pi}{NFFT}\right) \quad (2)$$

where X (f, l) is the Fast Fourier Transform (FFT) value of the frame l and the f frequency bin of the audio signal, and NFFT is the number of points of FFT (256 samples, for example).

After computing eq. (2) for all the frames, the average value of the spectral ratios ($SR_{audio}$) may be calculated as the mean of the spectral ratios of the frames whose modulation index is above a given threshold (for example 0.75). Frames with a modulation index above a given threshold usually correspond to speech signals, such that typically by calculating the mean of the spectral ratios of frames with a modulation index above a given threshold results in calculating the mean describing the parts of the audio signal comprising speech. The frames can be created from the audio signal using a window length of 20 msec. with shift of 10 msec, for example.

The low frequency ratio may e.g. be computed as the ratio between the signal energy from 100 Hz to 300 Hz and from 300 Hz to 500 Hz. Given a frame 1, it may be calculated as:

$$LFR(l) = \sum_{f=100\,Hz}^{300\,Hz} 20\log_{10}(|X(f,l)|) - \sum_{f=300\,Hz}^{500\,Hz} 20\log_{10}(|X(f,l)|). \quad (3)$$

After computing eq. (3) for all the frames, the average value of the spectral ratios ($LFR_{audio}$) may be calculated as the mean of the low frequency ratios of the frames whose modulation index is above a given threshold (for example 0.75). The frames can be created using a window length of 20 msec. with shift of 10 msec, for example.

Finally, the feature vector squared Mahalanobis distance may be computed between the average MFCC vectors (e.g. with dimension $N_{AS-MFCC}$) along the time obtained from the speaker recognition testing signal received in the audio access(es), (e. g. Front End AS in FIG. 2 or 3) and the one observed during enrollment (e.g. "AS model" in FIG. 2 or 3). A standard deviation diagonal matrix is typically also required to compute the distance (which is typically computed during or after enrollment and usually stored in the tamper-resistant element (e.g. in the AS module)).

A standard deviation diagonal matrix may e.g. be computed as disclosed in the European patent application EP 13 185 783.1 (Anti-Spoofing) filed by Agnitio.

Since the anti spoof model is typically not used outside the tamper-resistant element for security reasons, the anti spoofing features that should be introduced in the tamper-resistant element would be the spectral ratio, the low frequency ratio and the average MFCC vector (2+ $N_{AS\text{-}MFCC}$ dimension), e.g. because all of these parameters may allow inferring how a signal should look to pass the data integrity check.

When the model is used, it may be sufficient to provide an injection integrity check for anti spoofing (AS) features because no information about the non spoof model is available outside the tamper-resistant element. A speaker recognition knowledge-based integrity check may thus not be necessary. The non spoof model is typically speaker dependent.

Annex 2: Ensuring Injection Based Data Integrity

As mentioned, some paths outside the tamper-resistant element must maintain the data integrity, e.g. injection integrity (speaker access(es) may be assumed to be secure). For that purpose, nonce cryptography and digital signature schemes may be combined, e.g. for some or all variables handled outside of the tamper-resistant element, e.g. for all boxed variables in FIG. 2 or 3 (e.g. MFCCs, Stats, i-vector, AS features, PLDA stats, MFCC stats for G best Gaussians, UBM path). For example, given two modules, A (or client) and B (or server), that exchange information, from A to B, the process may comprise or consist of the following steps:

A asks for a nonce to B. If B is a secure module (i.e. considered secure), the nonce may be generated in B, if not, it could be extracted from a secure module or the tamper-resistant element.

A creates a data structure with the information which is required to be sent and the nonce; after that A calculates the hashcode, which is also included in the data structure, and encrypt it with a private key. The private key may be generated in module A, if it is secure, or it could be obtained from a secure module or the tamper-resistant element. Finally, the encrypted data structure is sent to B.

B received the encrypted data structure and, using the public key, decrypts the structure. After that, B calculates the hashcode and compares it against the one extracted from the data structure: If it is the same, the decrypt process continues extracting the nonce and comparing it with the one that B generated in the first step of the communication. If the nonce matches the one that B generated, the data is considered secure.

Typically, before said process is carried out, testation may be carried out to confirm that the modules A and B are what they claim to be.

Annex 3: Score of a PLDA Model

The score of a PLDA system (s) can be obtained from the PLDA stats ($F_1$ and $F_2$) (e.g. explained in S. J. D. Prince, "Probabilistic linear discriminant analysis for inferences about identity," in ICCV-11$^{th}$. IEEE, 2007, pp. 1-8 and Dehak N, Kenny P, Dehak R, Dumouchel P, Ouellet P. "Front-End Factor Analysis for Speaker Verification" published in Audio, Speech, and Language Processing, IEEE Transactions on. 2010) of enrollment (tr subscript) and testing (ts subscript), extracted from the previously computed enrollment and testing i-vectors as follows:

$$s = F_{2_{tr}}{}^T F_{2_{ts}} + \tfrac{1}{2} F_{2_{ts}}{}^T F_{2_{ts}} - \tfrac{1}{2} F_{1_{ts}}{}^T F_{1_{ts}} + f(F_{1_{tr}}, F_{2_{tr}}), \quad (4)$$

where $f(F_{1_{tr}}, F_{2_{tr}})$ is the PLDA constant in FIG. 2, which only depends on the enrollment data; $F_{2_{tr}}{}^T$ is Spk PLDA stats in FIG. 2 and $F_{1_{ts}}$ and $F_{2_{ts}}$ are the testing PLDA stats in FIG. 2. Note that setting $F_{2_{ts}}$ to high values will increase the score since there is a scalar product term $\tfrac{1}{2} F_{2_{ts}}{}^T F_{2_{ts}}$, so that a data integrity check in the tamper-resistant element is required (see e.g. Annex 4).

To avoid the injection of manipulated $F_{2_{ts}}$ that may increase the score significantly; some properties of the PLDA stats are used (note that $F_{2_{ts}}$ may not be protected outside the tamper-resistant element). Considering a given i-vector, i, the PLDA model may be expressed as explained in S. J. D. Prince, "Probabilistic linear discriminant analysis for inferences about identity" in ICCV-11$^{th}$, IEEE, 2007, pp. 1-8:

$$i = \mu + Vy + \varepsilon, \varepsilon \sim N(0, D^{-1}), \quad (5)$$

where $\mu$ is the i-vector mean, V is the eigenvoice matrix, y is the speaker factor vector and $\varepsilon$ is the residual model, which models the channel and any other aspect not considered in the eigenvoice matrix. Note that it is modeled as a Gaussian with zero mean vector and $D^{-1}$ covariance matrix (D is the precision matrix) D and V are typically obtained during developing. Note that even for several recordings only a single i-vector is considered, extracted adding the sufficient statistics obtained from the UBM ("Stats" in FIG. 2). Thus, the PLDA stats can be computed as:

$$F_* = V^T D(i - \mu), \quad (6)$$

$$F_{1_*} = (I + V^T DV)^{-\tfrac{1}{2}} F = C_1 F_*, \quad (7)$$

$$F_2 = (I + 2V^T DV)^{-\tfrac{1}{2}} F = C_2 F_*, \quad (8)$$

Where * represents tr or ts, and $$(H)^{-\tfrac{1}{2}}$$

is the inverse of the lower triangular matrix obtained by Cholesky decomposition of H, H being $I + V^T DV$ or $I + 2V^T DV$.

Therefore, the following relation holds:

$$F_{1_*} = C_1 C_2^{-1} F_{2_*} = A F_{2_*}, \quad (9)$$

where $A = C_1 C_2^{-1}$ is the (invertible) transformation that enables us to obtain one stat from the other.

Annex 4: An Example for a Speaker Recognition Knowledge Based Integrity Check for PLDA Stats In particular, to avoid the injection of manipulated $F_{2_{ts}}$ that may increase the score significantly, some properties of the PLDA stats are typically used (note that $F_{2_{ts}}$ may not be protected outside the tamper-resistant element). To avoid the manipulation of $F_{2_{ts}}$ that may increase the score significantly, the property expressed in eq. (9) of Annex 3 may be checked in the tamper-resistant element. If eq. (9) does not hold, the output of the match should be a rejection.

As mentioned, to perform the integrity check, it is needed to ensure eq. (9) on the tamper-resistant element, given the testing PLDA stats (PLDA stats in FIG. 2). This means that we would need to store the matrix A and perform a matrix multiplication. Since all entries in A are non-zero, and it is invertible and thus all row/columns are linear dependent, we can simplify the integrity check to ensuring that for a single i-th row $a_i^T$ of A, or equivalently for a single j-th row $\bar{a}_j^T$ of $A^{-1}$:

$$F_{1_{ts}}(i) = a_i^T F_{2_{ts}} \quad (10)$$

$$F_{2_{ts}}(j) = \bar{a}_j^T F_{1_{ts}} \quad (11)$$

In this operations all elements of $F_{1_{ts}}$ $F_{2_{ts}}$ are involved, and since $a_{jk} \neq 0$, $\bar{a}_{jk} \neq 0$, $k=1 \ldots N_{spkfac}$, where $N_{spkfac}$ is the dimension of the speaker factor vector (typically 120), any alteration in one of the stats them implies a modification in the other. Thus, to ensure that eq. (9) holds, the tamper-resistant element may be adapted for storing $a_i^T$ and $\bar{a}_j^T$, and perform two scalar products.

Normally, these steps do not require a lot of resources such that a tamper-resistant element, e.g. a SIM card, may be capable of storing $\bar{a}_j^T$ and $a_i^T$ and performing the scalar products.

If $F_{2_{ts}}$ is manipulated to increase the scalar product term $\frac{1}{2} F_{2_{ts}}^T F_{2_{ts}}$, and it is done properly (so that $F_{1_{ts}}$ is modified accordingly) it is not guaranteed that the final score s will increase, since $F_{1_{ts}} = A F_{2_{ts}}$ and the term $-\frac{1}{2} F_{1_{ts}}^T F_{1_{ts}}$ may compensate the manipulation (look at eq. (4)). Effectively, if it is assumed a general transformation as $\tilde{F}_{2_{ts}} = F_{2_{ts}} + \alpha$, and $F_{1_{ts}}$ modified accordingly, it can be proved that the optimum transformation parameter $\alpha$ would depend on $F_{2_{ts}}$ which is typically protected in the tamper-resistant element and thus considered inaccessible.

Annex 5: Hidden Markov Models

Hidden Markov Models (HMMs) comprise or consist of a set of states which correspond to a deterministically observable event and are connected by transition probability arcs. In addition, the observations are a probability density function (pdf) of the state, which are defined on a vector of parameters and are extracted from the voice signal. Usually, the pdf is selected by a mixture of Gaussians (Gaussian Mixture Model, GMM) in the multidimensional space of the feature vectors, although any kind of distributions could be used.

The components which define a complete HMM are:

A={$a_{ij}$}, the transition probabilities matrix, which are associated to the arcs and represent the probability of "moving" from state i to state j.

Π={$p_i$}, the initial state distribution, which are associated to the states and are the initial probabilities of each state.

b, Observation probability distributions, which are associated to the states and usually are a GMM. In that case, each Gaussian can be represent by a priori probability, $c_{sg}$, a mean vector, $\mu_{sg}$, and a covariance matrix, $\Sigma_{sg}$, where s and g represent the corresponding state and Gaussian.

The conventional approximation for using HMM in text-dependent speaker recognition framework is based on two steps: Enrollment and testing. During enrollment, the speaker model (HMM) is trained by applying some kind of HMM adaptation, such as Maximum a Posteriori, MAP, as e.g. explained in J. Gauvain and C. Lee, "Maximum posteriori estimation for multivariate Gaussian mixture observations of Markov chains", IEEE transactions on Speech and Audio Processing, 2(2):291, Maximum Likelihood Linear Regression, MLLR, as e.g. explained in C. J. Leggetter and P. C. Woodland, "Maximum likelihood linear regression for speaker adaptation of the parameters of continuous density hidden Markov models", Computer Speech and Language, 9:171-185 (1995). The HMM adaptation is carried out from a starting point model, usually the Universal Background Model (HMM UBM). During testing step, the most likelihood sequence of states and likelihood for speaker model and UBM are extracted using e.g. Viterbi or forward-backward algorithms as e.g. explained in L. R. Rabiner, "A tutorial of Hidden Markov Models and selected applications in speech recognition", Proc. Of IEEE vol. 77 (2): 257-286. (1989), given the testing feature vectors sequence derived from the speaker recognition testing signal. Thus, the final log likelihood ratio $LLR_{SID}$ is computed as:

$$LLR_{SID} = \log(LK_{spk}) - \log(LK_{UBM}) = LLK_{spk} - LLK_{UBM}, \quad (12)$$

where $\log(LK_{spk})$ and $\log(LK_{UBM})$ are the log likelihoods extracted with the testing feature vectors and the speaker and UBM models along the corresponding the optimum (most likely) sequence of states extracting by Viterbi algorithm.

Annex 6: Deriving a Score in an Exemplary Model Based on a HMM Approach

An exemplary solution to evaluate the text-dependent speaker recognition matching in a tamper-resistant element may be supported by the following approximations that might reduce the accuracy:

During testing, the likelihood of a GMM associated to a state may be approximated as the likelihood of the best Gaussian of that GMM (highest likelihood).

Given a feature vector sequence, usually MFCCs, the optimal sequences of states or paths after Viterbi decoding for the HMM UBM and for the speaker HMM may be assumed to be identical.

G Gaussians of the HMM UBM may be considered significantly adapted to the speaker, so that only those Gaussians must be evaluated. They may be selected during enrollment according the number of feature vectors that are associated to the Gaussians.

Speaker HMM model may be built using MAP adaptation, uploading only the mean feature vectors and the transition probabilities matrix. The mean adaptation may be modeled as an offset.

Considering the previous assumptions, so as the likelihood of a state can be approximated as the likelihood of its best Gaussian, the contribution of a set of $T_g$ frames $X_g = \{x_{g,1}, \ldots, x_{g,T_g}\}$ that belong to the same Gaussian g to the $LLK_{spk}$ (look at eq. (12) of Annex 5) model ignoring the transition probabilities can be computed as:

$$LLK_{spk_g}(X_g) = \sum_{t=1 \ldots T_g} \left( \log(K_g) - (x_{g,t} - \mu_g)^T \sum_g^{-1} (x_{g,t} - \mu_g) \right) \quad (13)$$

$$= T_g \left( \log(K_g) - \mu_g^T \sum_g^{-1} \mu_g \right) - \sum_{t=1 \ldots T_g} x_{g,t}^T \sum_g^{-1} x_{g,t} +$$

$$2\mu_g^T \sum_g^{-1} \sum_{t=1 \ldots T_g} x_{g,t},$$

where $\mu_g$, $\Sigma_g^{-1}$ and $K_g$ are respectively the mean, the covariance and the normalization term of Gaussian g. Note that subscript for the state, s, has not been included as it was done in the HMM definition for simplicity (each Gaussian is implicitly associated to an unique state). Furthermore, the normalization term $K_g$ involves the a priori probability, $c_g$, the determinant of the covariance matrix and one constant term:

$$K_g = (2\pi)^{-\frac{Dim}{2}} |\Sigma_g|^{-\frac{1}{2}} c_g,$$

where Dim is the dimension of the feature vectors, typically 60.

Analyzing eq. (13), the term $T_g(\log(K_g) - \mu_g^T \Sigma_g^{-1} \mu_g)$ is $T_g$ times a Gaussian dependent constant, $$-\sum_{t=1 \ldots T_g} x_{g,t}^T \Sigma_g^{-1} x_{g,t}$$

is the term related to the covariance of the Gaussian and it does not need to be computed since it is identical as the contribution of Gaussian g for the HMM UBM, $LLK_{UBM_g}$, taking into account that it is assumed that the optimal sequence of states after Viterbi decoding for the HMM UBM and for the speaker HMM are identical. Finally, $$2\mu_g^T \Sigma_g^{-1} \sum_g \sum_{t=1 \ldots T_g} x_{g,t}$$

is the "mean term" multiplied by the first order statistic of $X_g$. From this analysis, and the previously mentioned assumptions, the log likelihood ratio, $$LLR_{SID} = \qquad (14)$$

$$\sum_{g=1}^{G} \left(LLK_{spk_g} - LLK_{spk_g}\right) + \sum_{t=1}^{T} \left(\log(a_{s(t),s(t+1)}^{spk}) - \log(a_{s(t),s(t+1)}^{UBM})\right) =$$

$$\sum_{g=1}^{G} T_g\left(\left(-\mu_g^T \Sigma_g^{-1} \mu_g\right)_{spk} + \left(\mu_g^T \Sigma_g^{-1} \mu_g\right)_{UBM}\right) +$$

$$2\left(o_g^T \Sigma_g^{-1} \sum_g \sum_{t=1 \ldots T_g} x_{g,t}\right) + \sum_{t=1}^{T}\left(\log(a_{s(t),s(t+1)}^{spk}) - \log(a_{s(t),s(t+1)}^{UBM})\right)$$

would require to know the zero order statistics or number of frames, $T_g$, and the first order statistics, $$\sum_{t_g=1 \ldots T_g} x_{g,t}$$

for each Gaussian $g \in \{1, \ldots, G\}$ (MFCC stats for G best Gaussians in FIG. 3), and some information from the relation between the speaker voiceprint (speaker information) and the HMM UBM (spk and UBM subscripts, respectively in eq. (14)), as $o_g^T \Sigma_g^{-1}$, where $o_g^T$ is the offset between speaker voiceprint g best Gaussian mean and the corresponding one from the UBM (Speaker HMM: G best Gaussians in FIG. 3).

Furthermore, the knowledge of the constant value for each of G best Gaussians, $(-\mu_g^T \Sigma_g^{-1} \mu_g)_{spk} + (\mu_g^T \Sigma_g^{-1} \mu_g)_{UBM}$, which is also included in speaker HMM: G best Gaussians in FIG. 3 is required. Finally, it is required to know the sequence of states extracted with Viterbi algorithm and HMM-UBM (UBM path in FIG. 3 and s(t) in eq. (14), where T is the total number of testing feature vectors), to include the transition probabilities term in eq. (14). Note that it is only required to know the log difference transition probabilities matrix between the transition probabilities matrix of the speaker model and the transition probabilities matrix of UBM (Difference Transition Matrix in FIG. 3).

Annex 7: An Example for a Speaker Recognition Knowledge Based Integrity Check in an Exemplary HMM Based Approach Speaker recognition knowledge based integrity check (Integrity check in FIG. 3) may be evaluated analyzing if the MFCC stats for the G best Gaussians are coherent considering the Gaussians they represent and the observed frame histogram during enrollment.

Effectively, first order MFCC stats could be modified including for example a very high or very low value for one coefficient of one Gaussian, while the rest of coefficients could be fixed to 0. The selected value for the fixed coefficient would depend of the vector $o_g^T \Sigma_g^{-1}$ to set a very high score (see equation 14 of Annex 6).

Although it is not known since it is protected in the tamper-resistant element, only two options should be considered (it can be positive or negative).

To avoid this attack, the integrity check may be based on two steps. The first one may analyze if the first order MFCC stats are reasonable taking into account the front-end limits Effectively, the MFCCs range comes from a certain min_value to a certain max_value. Thus, each coefficient of the first order MFCC stats should be lower than $T_g$ times max_value and higher than $T_g$ (see Annex 6) times min_value.

The second integrity check step may compare the frame histogram observed during enrollment, $hist_{enr}(g)$ (number of frames that belong to Gaussian g, Frame histogram in FIG. 3) with the one extracted in testing, $hist_{test}(g)$. Both histograms are compared using some metrics, such as: $\max_g((hist_{enr}(g) - hist_{test}(g))^2$ and $\min_g((hist_{enr}(g) - hist_{test}(g))^2$, where the maximum and minimum of the histogram differences are extracted, and are compared to two thresholds which are considered, e.g. in order to reject the matching.

The invention claimed is:

1. A tamper-resistant element, adapted for speaker recognition, the tamper-resistant element being adapted for storing data representing speaker information based on speaker recognition enrollment data and for checking whether first information based on a speaker recognition testing signal matches the speaker information, wherein the tamper-resistant element is adapted for storing information for use in a spoof check, and for carrying out a spoof check using second information based on the speaker recognition testing signal, and in that the tamper-resistant element is also adapted for carrying out a data integrity check on the first information and the second information, wherein the data integrity check comprises an injection integrity check on whether the speaker recognition testing signal has been substituted by a signal that had been previously produced and accepted matching.

2. The tamper-resistant element according to claim 1, wherein the tamper-resistant element is adapted for storing data representing information for use in the data integrity check.

3. The tamper-resistant element according to claim 1, wherein the tamper-resistant element is adapted for text-dependent speaker recognition, wherein the tamper-resistant element is optionally adapted for use with a text-dependent Hidden Markov Model approach to speaker recognition.

4. The tamper-resistant element according to claim 1, wherein the tamper-resistant element is adapted for text-independent speaker recognition, wherein the tamper-resistant element is adapted for use with a text-dependent i-vector-based speaker recognition approach.

5. The tamper-resistant element according to claim 1, wherein the tamper-resistant element comprises one of: a smart card, a secure server, a trusted platform module, and an ARM trust zone.

6. A tamper-resistant element, adapted for speaker recognition, the tamper-resistant element being adapted for storing data representing speaker information based on speaker recognition enrollment data and for checking whether first information based on a speaker recognition testing signal matches the speaker information, wherein the tamper-resistant element is adapted for storing information for use in a spoof check, and for carrying out a spoof check using second information based on the speaker recognition testing signal, and in that the tamper-resistant element is also adapted for carrying out a data integrity check on the first information and the second information, wherein the data integrity check comprises a speaker recognition knowledge based integrity check to check that no data is modified to take advantage of knowledge of the speaker recognition system, and wherein the tamper-resistant element is optionally also adapted for storing information for use in the speaker recognition knowledge based integrity check.

7. The tamper-resistant element according to claim 6, wherein the tamper-resistant element is adapted for storing data representing information for use in the data integrity check.

8. The tamper-resistant element according to claim 6, wherein the tamper-resistant element is adapted for text-dependent speaker recognition, wherein the tamper-resistant element is optionally adapted for use with a text-dependent Hidden Markov Model approach to speaker recognition.

9. The tamper-resistant element according to claim 6, wherein the tamper-resistant element is adapted for text-independent speaker recognition, wherein the tamper-resistant element is adapted for use with a text-dependent i-vector-based speaker recognition approach.

10. The tamper-resistant element according to claim 6, wherein the tamper-resistant element comprises one of: a smart card, a secure server, a trusted platform module, and an ARM trust zone.

11. A system comprising a tamper-resistant element for speaker recognition, the tamper-resistant element being adapted for storing data representing speaker information based on speaker recognition enrollment data and for checking whether first information based on a speaker recognition testing signal matches the speaker information, wherein the tamper-resistant element is adapted for storing information for use in a spoof check, and for carrying out a spoof check using second information based on the speaker recognition testing signal, and in that the tamper-resistant element is also adapted for carrying out a data integrity check on the first information and the second information, wherein the system is adapted for deriving information based on the speaker recognition testing signal from the speaker recognition testing signal outside of the tamper-resistant element, and wherein the system is adapted for deriving said first information based on the speaker recognition testing signal outside of the tamper-resistant element in parallel to deriving said second information based on the speaker recognition testing signal outside of the tamper-resistant element.

12. The system according to claim 11, wherein one, two, three or more hyperparameters are stored outside of the tamper-resistant element.

13. The system according to claim 11, wherein the system is adapted for deriving said first information based on the speaker recognition testing signal outside of the tamper-resistant element.

14. The system according to claim 11, wherein the system is adapted for deriving said second information based on the speaker recognition testing signal outside of the tamper-resistant element.

15. The system according to claim 11, wherein the system is adapted for maintaining data integrity of data representing information based on the speaker recognition testing signal or any data derived from the speaker recognition testing signal outside of the tamper-resistant element.

16. The system according to claim 11, wherein the system is adapted such that the tamper-resistant element is adapted to carry out a spoof check of the speaker recognition testing signal based on features derived from the speaker recognition testing signal outside of the tamper-resistant element.

17. The system according to claim 11, wherein the tamper-resistant element comprises one of: a smart card, a secure server, a trusted platform module, and an ARM trust zone.

18. A system comprising a tamper-resistant element for speaker recognition, the tamper-resistant element being adapted for storing data representing speaker information based on speaker recognition enrollment data and for checking whether first information based on a speaker recognition testing signal matches the speaker information, wherein the tamper-resistant element is adapted for storing information for use in a spoof check, and for carrying out a spoof check using second information based on the speaker recognition testing signal, and in that the tamper-resistant element is also adapted for carrying out a data integrity check on the first information and the second information, wherein the system is adapted for deriving information based on the speaker recognition testing signal from the speaker recognition testing signal outside of the tamper-resistant element, and wherein the system is adapted such that the tamper-resistant element is adapted to carry out a check of a speaker recognition knowledge based integrity of the data representing information based on the speaker recognition testing signal received from outside of the tamper-resistant element.

19. The system according to claim 18, wherein one, two, three or more hyperparameters are stored outside of the tamper-resistant element.

20. The system according to claim 18, wherein the system is adapted for deriving said first information based on the speaker recognition testing signal outside of the tamper-resistant element.

21. The system according to claim 18, wherein the system is adapted for deriving said second information based on the speaker recognition testing signal outside of the tamper-resistant element.

22. The system according to claim 18, wherein the system is adapted for maintaining data integrity of data representing information based on the speaker recognition testing signal or any data derived from the speaker recognition testing signal outside of the tamper-resistant element.

23. The system according to claim 18, wherein the system is adapted such that the tamper-resistant element is adapted to carry out a spoof check of the speaker recognition testing signal based on features derived from the speaker recognition testing signal outside of the tamper-resistant element.

24. The system according to claim 18, wherein the tamper-resistant element comprises one of: a smart card, a secure server, a trusted platform module, and an ARM trust zone.

* * * * *

UNITED STATES PATENT AND TRADEMARK OFFICE
CERTIFICATE OF CORRECTION

PATENT NO. : 10,056,084 B2
APPLICATION NO. : 15/216196
DATED : August 21, 2018
INVENTOR(S) : Aviles-Casco et al.

It is certified that error appears in the above-identified patent and that said Letters Patent is hereby corrected as shown below:

In the Specification

1. In Column 1, Line 8, delete "2014," and insert -- 2014, now Pat. No. 9,431,016, --, therefor.

2. In Column 2, Line 65, delete "algorithms Typically," and insert -- algorithms. Typically, --, therefor.

3. In Column 7, Line 49, delete "algorithms A" and insert -- algorithms. A --, therefor.

4. In Column 15, Line 43, delete "resources:" and insert -- resources. --, therefor.

5. In Column 18, Line 26, delete "f frequency" and insert -- f is the frequency --, therefor.

6. In Column 18, Line 40, delete "msec." and insert -- msec --, therefor.

7. In Column 18, Line 44, delete "frame 1," and insert -- frame l, --, therefor.

8. In Column 18, Line 56, delete "20 msec." and insert -- 20 msec --, therefor.

9. In Column 21, Line 12, delete "operations all elements of $F_{1_{ts}} F_{2_{ts}}$" and insert -- operation all elements of $F_{1_{ts}}$ and $F_{2_{ts}}$ --, therefor.

10. In Column 21, Line 28, delete "$F_{1_{ts}}$" and insert -- $F_{1_{ts}}$ is --, therefor.

11. In Column 21, Line 30, delete "$F_{2_{ts}}$" and insert -- $F_{2_{tr}}$ --, therefor.

Signed and Sealed this
Fourth Day of December, 2018

Andrei Iancu
*Director of the United States Patent and Trademark Office*

CERTIFICATE OF CORRECTION (continued)
U.S. Pat. No. 10,056,084 B2

12. In Column 23, Line 2, delete "an unique" and insert -- a unique --, therefor.

13. In Column 24, Line 34, delete "limits" and insert -- limits. --, therefor.

14. In Column 24, Lines 45-46, delete "$((hist_{enr}(g)-hist_{test}(g))^2$ and $min_g((hist_{enr}(g)-hist_{test}(g))^2$," and insert -- $(hist_{enr}(g)-hist_{test}(g))^2$ and $min_g(hist_{enr}(g)-hist_{test}(g))^2$, --, therefor.